(12) United States Patent
Klotblixt

(10) Patent No.: US 9,283,662 B2
(45) Date of Patent: Mar. 15, 2016

(54) METHOD FOR TIGHTENING SCREW JOINTS WITH A HAND HELD POWER TOOL

(75) Inventor: Adam Klotblixt, Stockholm (SE)

(73) Assignee: ATLAS COPCO INDUSTRIAL TECHNIQUE AB, Stockholm (SE)

(*) Notice: Subject to any disclaimer, the term of this patent is extended or adjusted under 35 U.S.C. 154(b) by 259 days.

(21) Appl. No.: 14/005,811

(22) PCT Filed: Mar. 14, 2012

(86) PCT No.: PCT/EP2012/054436
§ 371 (c)(1),
(2), (4) Date: Sep. 17, 2013

(87) PCT Pub. No.: WO2012/126780
PCT Pub. Date: Sep. 27, 2012

(65) Prior Publication Data
US 2014/0013564 A1    Jan. 16, 2014

(51) Int. Cl.
*B25B 23/14*    (2006.01)
*B23Q 17/09*    (2006.01)

(52) U.S. Cl.
CPC .............. *B25B 23/14* (2013.01); *B23Q 17/0961* (2013.01); *Y10T 29/49764* (2015.01); *Y10T 29/49766* (2015.01); *Y10T 29/49771* (2015.01); *Y10T 29/49776* (2015.01)

(58) Field of Classification Search
CPC .............. B25B 23/14; Y10T 29/49776; Y10T 29/49771; Y10T 29/49764; Y10T 29/49766; B23Q 17/0961
See application file for complete search history.

(56) References Cited

U.S. PATENT DOCUMENTS

| 5,216,795 A | 6/1993 | Hansson |
| 5,245,747 A | 9/1993 | Hansson |
| 6,785,591 B1 * | 8/2004 | Hansson ................. 700/275 |

OTHER PUBLICATIONS

International Search Report (ISR) dated Jul. 31, 2012 issued in International Application No. PCT/EP2012/054436.

* cited by examiner

*Primary Examiner* — John C Hong
(74) *Attorney, Agent, or Firm* — Holtz, Holtz & Volek PC

(57) ABSTRACT

A method of a hand held torque delivering power tool for tightening a screw joint up to a predetermined target torque level, the method including applying a tightening torque to the screw joint during a tightening phase via a snug torque level, indicating during the tightening phase a torque growth characteristic, interrupting the torque application on the screw joint upon arrival at a target torque level to prevent further rotation of the screw joint, and resuming the torque application via a declination ramp at a declining rate after the target torque level is reached. The resumed torque application is declined at a rate corresponding to the indicated torque growth characteristic to obtain an ergonomically favorable torque reaction characteristic in the power tool.

4 Claims, 1 Drawing Sheet ns with a Hand Held Power Tool

METHOD FOR TIGHTENING SCREW JOINTS WITH A HAND HELD POWER TOOL

The invention relates to a method for tightening screw joints up to a predetermined target torque level by means of a hand held power tool, wherein the physical strain on the operator is substantially reduced by a continued torque application on the screw joint at a declining rate after the target torque level is reached. In particular, the invention is related to a method for adapting the declining rate of the torque application to the operators ability to counteract the reaction torque caused in the power tool without being exposed to an uncomfortably high muscular strain.

A screw joint tightening method including these features is described in U.S. Pat. No. 5,216,795.

The method for screw joint tightening described in the above patent addresses the problem inherent in an operators ability to react by muscle force to the normally abrupt disappearance of reaction torque in the power tool as the power is suddenly shut off at the arrival at the target torque level. In a very short tightening process, i.e. a short time interval between the start of torque build-up to the power shut-off, the operators ability to build up a counteracting muscle force is inevitably delayed, and because the process time is very short the built up muscle force does not have time to reach a full magnitude before the tightening is all over. In this case the strain exerted on the operator is moderate only. In a slower tightening process wherein the time interval between the start of torque build-up in the screw joint and the target torque shut-off is longer the operator is able to build up a full counteracting muscle force, and when the power is suddenly shut-off at the arrival at the target torque level the sudden disappearance of the reaction torque is too sudden for the operators muscles to relax which results in a uncomfortable and tiresome jerk in the operators arm.

In order to avoid heavy uncomfortable jerks at the end of a tightening process as described in the above mentioned patent there is suggested to continue the torque application on the screw joint at a successively declining rate after the target torque level is reached and the rotational movement of the screw joint is discontinued so as to successively reduce the reaction torque to be counteracted by the operator and accordingly make it possible for the operator to counteract the reaction torque in a more comfortable way. The described method however suggests the torque declination to be set at a certain favourable rate suitable for a certain screw joint having certain torque growth characteristics and for a power tool having certain operational characteristics.

A problem inherent in the above described and previously known method is that the rate of torque declination after the target torque level is reached has to be set to a certain value to adapt the reaction torque characteristics to the torque rate of the actual screw joint and to the operational characteristics of the very power tool used during the tightening. It is also necessary to adapt the torque declination rate to suit the operators ability to handle the reaction torque generated in the power tool.

When using the power tool on screw joints with different torque rates the torque declination rate has to be individually set to correspond to the torque rate of the screw joint actually being tightened and to the operators requirement on a comfortable reaction torque handling. This is a time consuming operation since every new setting of the torque declination rate has to be tested on the actual screw joint to check whether it is satisfactory for the operator or not.

It is essential from the ergonomic point of view that the torque declination rate or the time interval for declining the applied torque after the target torque level is reached is proportional to the actual torque growth or the duration of the tightening process between the snug level and the target torque level. If the duration of the post target torque declination is very short in comparison to the tightening torque duration there will be no ergonomic effect at all, and the operator would still experience an abrupt discontinuation of the applied torque and an annoying jerk in the power tool. When tightening a very stiff screw joint there is a very short duration of the tightening interval between the snug level and the target torque level, which means that there will be no need for a post target torque declination ramp at all. The reason is that the very short duration of the reaction torque generated in the power tool during tightening will be absorbed by the inertia of the power tool itself, and the operator will not be exposed to any reaction torque at all. Also, the operator is too slow in his muscular reaction to be able to react to such fast changes in reaction torque.

If the duration of the torque declination after the target torque is reached is too long in relation to the duration of the tightening interval there will be no uncomfortable jerks in the power tool at the power shut-off, because the operator would have plenty of time to adapt his muscular counterforce to the declining reaction torque. Instead, the entire tightening process would be unnecessarily extended, and the tightening process would be experienced to be sluggish and time consuming and creating a mental stress factor for the operator.

It is an object of the invention to provide an improved screw joint tightening method wherein the declination rate of the torque applied on the screw joint after a target torque level is reached is adapted to the torque growth characteristics of an individual screw joint indicated during the actual tightening process before reaching the target torque level so as to obtain a comfortable reaction torque characteristic with a low muscular strain level for the operator as a power tool with known operational characteristics is applied on screw joints having different torque rates.

It is a further object of the invention to provide an improved screw joint tightening method wherein the declination rate of the torque applied on the screw joint after a target torque level is reached is adapted to the indicated time lapsed between a point corresponding to a torque snug level and a point corresponding to the target torque level during the actual tightening process to thereby obtain a comfortable reaction torque characteristic with a low muscular strain level for the operator as a power tool with known operational characteristics is applied on screw joints with different torque growth characteristics.

Further objects and advantages of the invention will appear from the following specification and claims.

A preferred embodiment of the invention will be described in further detail below with reference to the accompanying drawing.

IN THE DRAWING

Figure 1:
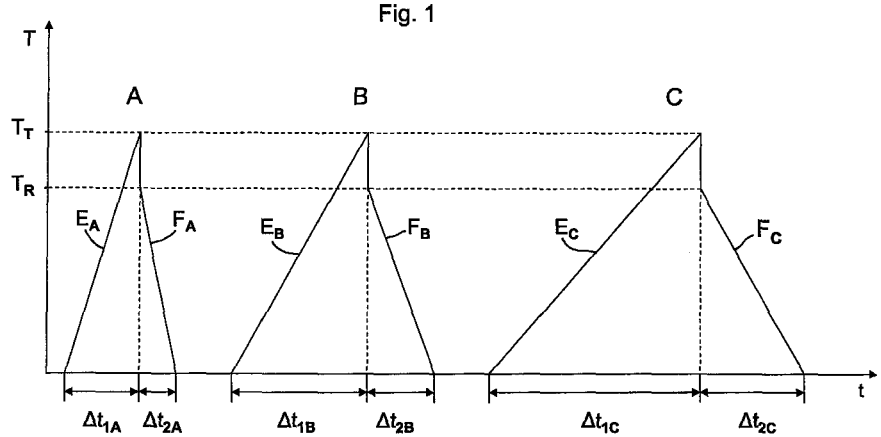
FIG. 1 shows diagrams illustrating the torque—time relationship during screw joint tightening operations at screw joints of different torque growth characteristics.

The three diagrams in FIG. 1 illustrate in a simplified way the installed torque over time in three different screw joints A, B and C by using one and the same hand held torque delivering power tool, i.e. a power tool having known operation characteristics like speed, power output etc. The three screw joints A, B and C have different torque growth characteristics, with the steepest torque growth in screw joint A, an intermediate torque growth characteristic in the screw joint B, and a relatively slow torque build-up in screw joint C. Accordingly, screw joint A is the stiffest screw joint and C the softest. Each curve of the diagram comprises a substantially linear torque build-up phase $E_A$, $E_B$ and $E_C$, respectively, extending from a non-illustrated snug level, where the respective screw joint is settled, up to a predetermined target torque level $T_T$. As the target torque level $T_T$ is reached the power supply to the power tool is cut off to stop rotation of the screw joint and prevent further torque increase in the screw joint.

In order to avoid a very sudden interruption of the reaction torque in the power tool and to mitigate the demand for a tiresome muscular counteraction on the part of the operator the power supply to the power tool is resumed at a point $T_R$ a very short non-illustrated time interval after the target torque level $T_T$ is reached. As being illustrated by the curves in FIG. 1 the resumed torque $F_{A-C}$ is applied at a declining rate from a starting torque level $T_R$, and depending on the different torque growths of the screw joints the declining rate of the resumed torque application $F_{A-C}$ is extended over different time intervals in the three screw joints A-C. The torque level $T_R$ from which the declining resumed torque is started is substantially lower than the target torque level $T_T$ to ensure that no further movement of the screw joint occurs. As illustrated in the diagrams, screw joint A is a stiff screw joint which means that the target torque level $T_T$ is reached in a relatively short time interval $\Delta t_{1A}$, whereas at screw joint B the tightening torque build-up takes place during a longer time interval $\Delta t_{1B}$, and at screw joint C the torque build-up is accomplished during a still longer time interval $\Delta t_{1C}$.

It is important for the reaction torque mitigating effect of the ramp of resumed torque application that the time interval $\Delta t_{2A-C}$ during which the resumed torque acts has a certain relationship to the torque build-up time $\Delta t_{1A-C}$. The torque growth or torque build-up time $\Delta t_{1A-C}$ depends both on the stiffness of the actual screw joint and the speed of the torque application, i.e. the rotation speed of the power tool. However, when using one and the same power tool for tightening a number of screw joints it is the individual stiffness of the screw joints that will be determining for the torque build-up time $\Delta t_{1A-C}$ and, hence, for the torque declination rate to be used. The used torque declination rate should correspond to a certain time $\Delta t_{1A-C}$ interval $\Delta t_{2A-C}$ which is related to the time interval $\Delta t_{1A-C}$ for the screw joint tightening phase E.

As being illustrated by the curves in FIG. 1, the time interval $\Delta t_{2A}$ for applying a declining post tightening torque $F_A$ on screw joint A is short as is the time interval $\Delta t_{1A}$ for the tightening phase $E_A$ for that screw joint up to the target torque level $T_T$. The time interval $\Delta t_{2B}$ for the post tightening torque application $F_B$ on screw joint B is related to the time interval $\Delta t_{1B}$ for the tightening phase $E_B$ of screw joint B. Accordingly, the time interval $\Delta t_{2C}$ for the post tightening torque application phase $F_C$ on screw joint C is relatively long and is related to the time interval $\Delta t_{1C}$ for the tightening phase $E_C$ of the screw joint C. So, the longer tightening phase $E_{A-C}$ of the screw joint the longer the resumed declining torque application $F_{A-C}$.

Figure 2:
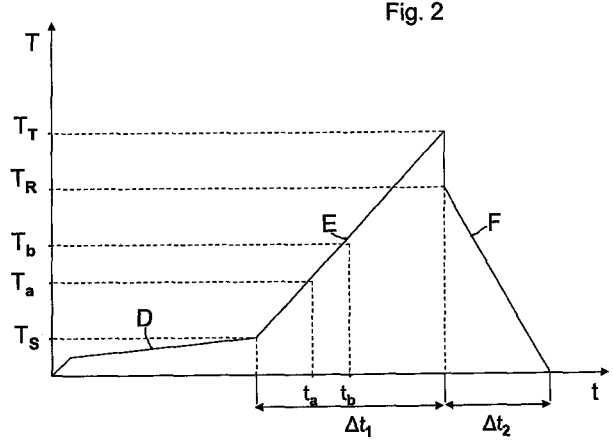
FIG. 2 shows a diagram illustrating a tightening process performed in accordance with the invention.

In FIG. 2 there is illustrated in somewhat more detail a torque application curve for a screw joint, wherein the tightening process starts by a low magnitude torque response D from the screw joint until a snug level $T_S$ is reached. The actual tightening or pre-tensioning phase E of the screw joint starts from the snug level $T_S$, and takes place linearly up to the desired target torque level $T_T$. This tightening phase E has a duration $\Delta t_1$. At the target torque level $T_T$ the power supply to the power tool is shut off to stop the rotation of the screw joint.

In practice, the power is shut off just before the target torque level $T_T$ is reached to thereby avoid an undesired inertia related torque overshoot. This is, however, not illustrated in the simplified FIG. 2.

After a very short time interval, not illustrated in FIG. 2, the torque application on the screw joint is resumed at a declining rate to form a soft stop ramp F. The continued torque application on the screw joint is started at a level $T_R$ well below the target torque level $T_T$ to ensure that no further rotation of the screw joint takes place. This soft stop ramp F has a torque declination rate that is chosen so as to reach the zero level at a time interval $\Delta t_2$ from the point where the target torque $T_T$ is reached.

From the ergonomic point of view, it is important that duration $\Delta t_2$ of the soft stop ramp F is chosen so as to match the duration $\Delta t_1$ of the tightening phase E of each screw joint. A correct chosen duration $\Delta t_2$ of the soft stop ramp F makes it possible for the operator of the power tool to adapt his muscular alert and force to counteract the reaction torque in the power tool in a comfortable way, i.e. without any tiring jerks.

In order to find an optimum soft stop ramp duration $\Delta t_2$ for the tightening process on a screw joint of any type the torque growth per time unit characteristic of the screw joint is determined. The condition for this is that the operation characteristics of the used power tool, such as rotation speed, and power output, are known. The torque growth characteristic of the actual screw joint is determined by indicating the relationship between the snug level torque level $T_S$ and the target torque level $T_T$, and the time interval $\Delta t_1$ for the tightening phase E. Then, a suitable duration $\Delta t_2$ of the soft stop torque declination ramp F is chosen. The rate of the torque declination ramp F corresponds to the relationship between the difference in torque magnitude from the torque resuming level $T_R$ to zero and the time interval $\Delta t_2$.

What a suitable duration $\Delta t_2$ of the torque declination ramp F is is determined by empiric results from pre-tightening test procedures where power tool operators have tightened a number of screw joints of different torque growth characteristics using the same power tool. The suitable torque declination ramp duration $\Delta t_2$ is intimately dependent on the operation characteristics of the power tool, since the torque growth per time unit is dependent on the operation speed of the power tool. The relationship between the duration $\Delta t_2$ of torque declination ramp F and the duration $\Delta t_1$ of the tightening phase E that is experienced by the operator to be the most comfortable is chosen to be used in production screw joint tightening operations.

An alternative way of establishing the actual torque growth or tightening phase duration $\Delta t_1$ is to indicate the difference in torque between two arbitrarily chosen points of time $t_a$ and $t_b$ during the tightening phase. The difference between the torque magnitudes, $T_a$ and $T_b$, indicated between the two points $t_a$ and $t_b$ is a measure on the torque growth during the tightening phase E.

A way of calculating a suitable post-target declination rate of the resumed torque application ramp F for the actually tightened screw joint is to integrate the difference in torque difference per time unit to enable an energy based comparison between the tightening phase E and the soft stop ramp F. A certain empirically determined relationship between the energy content of the tightening phase E and the torque declination ramp F is used to establish a suitable and less tiresome reaction torque counteracting muscular action developed by the operator.

The method according to the invention provides a way to determine a suitable and comfortable reaction torque characteristic by adapting automatically the torque declination rate of the post-target resumed torque application on the screw joint being tightened, despite the torque growth characteristic of the actually tightened screw joint. This means that the declination rate of the resumed torque application is determined during the tightening phase by indication of the torque growth of the actually tightened screw joint, which means that any presetting of the declination rate is not necessary.

The invention claimed is:

1. A method for tightening a screw joint up to a predetermined target torque level ($T_T$) by means of a hand held torque delivering power tool, the method comprising:
    applying a tightening torque to the screw joint to reach the target torque level ($T_T$) via a low torque snug level ($T_S$),
    indicating at least one torque growth characteristic ($\Delta t_1$) during a tightening phase (E) between the low torque snug level ($T_S$) and the target torque level ($T_T$),
    interrupting the tightening torque applied on the screw joint upon arrival at the target torque level ($T_T$) to thereby stop further rotation of the screw joint, and
    resuming torque application via a declination ramp (F) at a declining rate after the target torque level ($T_T$) is reached, wherein the resumed torque application is declined at a rate corresponding to said at least one torque growth characteristic ($\Delta t_1$) indicated during the tightening phase before reaching the target torque level ($T_T$) to thereby obtain an ergonomically favourable torque reaction characteristic in the hand held torque delivering power tool.

2. The method according to claim 1, wherein said at least one torque growth characteristic ($\Delta t_1$) comprises a time elapsed between a point corresponding to the low torque snug level ($T_S$) and a point corresponding to the target torque level ($T_T$), and wherein the declining rate of the declination ramp (F) corresponds to a time interval corresponding to said time elapsed between the low torque snug level point and the target torque level point.

3. The method according to claim 1, wherein said at least one torque growth characteristic comprises a time elapsed between two or more points ($t_a$ and $t_b$) selected between a point corresponding to the low torque snug level ($T_S$) and a point corresponding to the target torque level ($T_T$), and wherein said elapsed time ($t_b-t_a$) is integrated with a corresponding torque difference ($T_b-T_a$) between said two or more points to obtain an energy based reference for adapting the declining rate of the resumed torque application.

4. The method according to claim 1, wherein said declination ramp (F) is started by applying a power tool output power more than 10% below a maximum output power of the hand held torque delivering power tool used during the tightening phase (E).

* * * * *